United States Patent Office 2,788,342
Patented Apr. 9, 1957

2,788,342
COBALTIFEROUS AZO-DYESTUFFS

Arthur Buehler, Rheinfelden, Alfred Fasciati, Bottmingen, and Christian Zickendraht, Binningen, Switzerland, assignors to Ciba Limited, Basel, Switzerland, a Swiss firm No Drawing. Application December 15, 1952, Serial No. 326,142

Claims priority, application Switzerland December 15, 1951

14 Claims. (Cl. 260—145)

According to this invention valuable new metalliferous azo dyestuffs are made by treating with an agent yielding cobalt a monoazo-dyestuff free from sulfonic acid and carboxylic acid groups and corresponding to the general formula (1) 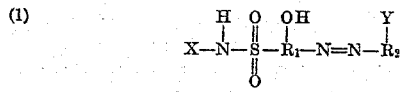

in which Y represents an amino or hydroxyl group, $R_1$ represents a benzene radical bound to the azo linkage in ortho-position to the hydroxyl group,

represents the radical of a coupling component bound to the azo linkage in a position vicinal to the group Y, and X represents an aryl radical which contains a substituent of the formula

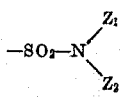

in which $Z_1$ and $Z_2$ each represent a hydrogen atom or an aliphatic radical containing at most 6 carbon atoms.

The monoazo-dyestuffs of the above formula used as starting materials are in part known. They can be made by coupling a coupling component, which is free from sulfonic acid and carboxylic acid groups and is capable of coupling in a position vicinal to an amino or hydroxyl group, with an ortho-hydroxy-diazo-compound free from sulfonic acid and carboxylic acid groups, such as the compounds obtained by diazotizing an amine of the formula (2) 

in which the symbols $R_1$ and X have the meanings given in connection with Formula 1 above.

The benzene radical $R_1$ of these amines may contain the amino group in the 2-position, the hydroxyl group in the 1-position and the —$SO_2$—NH—X group in the 4-, 5- or 6-position. The benzene radical $R_1$ may contain further substituents incapable of salt formation, for example, a halogen atom or a nitro group. The aryl radical X may be, for example, a naphthalene or advantageously a benzene radical, which contains a sulfonic acid amide group, for example, a sulfonic acid alkylamide or sulfonic acid hydroxyalkylamide group, but advantageously the group of the formula —$SO_2$—$NH_2$, and, if desired, further substituents such as an alkyl group, for example, methyl, a chlorine atom or the like.

Compounds of the Formula 2 may be made, for example, from amines of the formula X—$NH_2$, in which X has the meaning given above, and 1-chloro-2-nitrobenzene-4-sulfonic acid chloride, by reacting the resulting 1-chloro-2-nitrobenzene-4-sulfonic acid amide with an alkali or alkaline earth metal hydroxide to form the corresponding 1-hydroxy-compound, and converting the nitro group in the latter in known manner into an amino group. Instead of 1-chloro-2-nitrobenzene-4-sulfonic acid chloride, there may be used as starting material, for example, 1:2-benzoxazolone-5-sulfonic acid chloride, in which case after the condensation with the amine of the formula X—$NH_2$ to form the corresponding 1:2-benzoxazolone-5-sulfonic acid amide it is only necessary to hydrolyze the oxazolone ring in order to obtain the compounds of Formula 2.

As amines of the Formula 2 there may be mentioned: 2 - amino - 1 - hydroxybenzene - 4 - sulfonic acid - N - 1'- naphthylamide - 4' - sulfonic acid amide, 2 - amino - 1- hydroxy - 6 - chlorobenzene - 4 - sulfonic acid - phenylamide - 3' - sulfonic acid amide, 2 - amino - 1 - hydroxy- 6 - nitro - benzene - 4 - sulfonic acid - phenylamide - 4'- sulfonic acid amide, 2 - amino - 1 - hydroxybenzene - 4- or - 5 - sulfonic acid - phenylamide - 3' - sulfonic acid methylamide, 2 - amino - 1 - hydroxybenzene - 4 - or - 5- sulfonic acid phenylamide - 3' - sulfonic acide - β - hydroxyethylamide, 2 - amino - 1 - hydroxybenzene - 4 - or - 5 - sulfonic acid phenylamide - 4' - isopropyl - or n- butylamide, 2 - amino - 1 - hydroxybenzene - 4 - or - 5- sulfonic acid - phenylamide - 3' - sulfonic acid dimethyl- amide, 2 - amino - 4 - chloro - 1 - hydroxybenzene - 5 - or - 6 - sulfonic acid phenylamide - 3' - sulfonic acid amide and especially 2 - amino - 1 - hydroxybenzene - 4 - or - 5 - sulfonic acid phenylamide - 2' -, - 3' - or - 4' - sulfonic acid amide.

As coupling components for preparing the monoazo- dyestuffs serving as starting materials there come into consideration amino- and advantageously hydroxy-com- pounds, which are free from sulfonic acid and carboxylic acid groups and are capable of coupling in a position vicinal to an amino or hydroxy group. As amino-com- pounds of this kind there may be mentioned, for exam- ple, naphthylamines such, for example, as β-naphthyl- amine or 1-aminonaphthalene-4-sulfonic acid amide. Among the hydroxy-compounds there are also included in addition to aromatic hydroxy-compounds compounds which owe their capacity for coupling to the presence of a keto-methylene group. The latter compounds may contain the keto-methylene group either in an open chain or in a heterocyclic ring.

As hydroxy-compounds of the above kind there may be mentioned:

(a) Para-substituted hydroxybenzenes such as 4-meth- yl-, 3:4-dimethyl-, 4-tertiary-amyl- or 4-acetylamino-1- hydroxybenzene and 4-methyl-2-acetylamino-1-hydroxy- benzene, dihydroxybenzenes such as resorcinol, hydroxy- naphthalenes such as 2-hydroxynaphthalene, 2:6-dihy- droxynaphthalene, 2-hydroxy-6-bromo- or 6-methoxy- naphthalene, 1-hydroxy-4-methylnaphthalene, 2-hydroxy- naphthalene-6-sulfonic acid amide, 1-hydroxy-5-chloro- naphthalene, 1-hydroxy-5:8-dichloronaphthalene, and also 1-acylamino-7-hydroxynaphthalenes such as 1-acetyl- amino, 1-n-butyrylamino- or 1-benzoylamino-7-hydroxy- naphthalene, 7-hydroxynaphthyl(1)-carbamic acid ethyl- or -methyl ester.

(b) Pyrazolones such as 3-methyl- or 3-phenyl-5- pyrazolone, 1-n-butyl-3-methyl-5-pyrazolone, 1-phenyl-3- methyl-5-pyrazolone, 1-(2'-, 3'- or 4'-chloro)-phenyl- 3-methyl-5-pyrazolone, 5-pyrazolone-3-carboxylic acid amide, 5-pyrazolone-3-carboxylic acid-N-methyl-, -ethyl-, -isopropyl-, -secondary butyl-, -tertiarybutyl- or -n-butyl- amide, 5-pyrazolone-3-carboxylic acid-N-2'-, -3'- or -4'- chlorophenylamide, 5-pyrazolone-3-carboxylic acid-N- phenyl- or -p-tolyl-amide, 1-phenyl-5-pyrazolone-3-car- boxylic acid amide, barbituric acids such as barbituric acid itself, dihydroxyquinolines such as 2:4-dihydroxyquinoline, acylacetic acid esters or amides such as acetoacetic acid amide, acetoacetic acid N-methyl-, -n-butyl- or -phenyl-amide, acetoacetic acid N-dimethylamide, acetoacetic acid N-2'-, -3'- or -4'-chlorophenylamide, benzoylacetic acid amide or benzoylacetic acid phenylamide.

The amines of the Formula 1 may be diazotized in the usual manner with the use of sodium nitrite and hydrochloric acid. The diazo compounds so obtained may be coupled with the aforesaid coupling components also in the usual manner.

When the coupling reaction has finished the dyestuff can easily be separated from the coupling mixture by filtration, as they are in general only slightly soluble in water. Indeed in the form of their alkali compounds they are still sufficiently soluble in water to enable them to be used in dyeing from dyebaths which need no addition of acid.

In accordance with the present process cobalt compounds can be obtained, which contain 1 atom of cobalt for every one or two molecules of monoazo-dyestuff. When ortho:ortho'-dihydroxy-monoazo-dyestuffs are used as starting materials the cobalt compounds which contain one atom of cobalt for every two molecules of monoazo-dyestuff are especially valuable.

In order to produce such 1:2-complexes it is in general desirable to use a quantity of the agent yielding cobalt containing about one gram-atom of cobalt for every two mols of a dyestuff corresponding to the general Formula 1 or for about one mol of each of two different dyestuffs in a mixture in which at least one of the dyestuffs corresponds to the general Formula 1 and/or to carry out the metallization in a weakly acid to alkaline medium. As agents yielding cobalt there come into consideration complex cobalt compounds of aliphatic hydroxy-carboxylic acids or dicarboxylic acids, and simple salts of divalent cobalt such as cobalt sulfate, cobalt acetate or cobalt formate, and, if desired, cobalt hydroxide. The conversion of the dyestuffs into complex cobalt compounds is advantageously carried out at a raised temperature, under atmospheric or superatmospheric pressure, for example, at the boiling temperature of the reaction mixture, if desired, in the presence of suitable additions, for example, in the presence of salts of organic acids, bases, organic solvents or other agents assisting the formation of complexes.

The metallization described above may be carried out, for example, upon a single dyestuff of the Formula 1. However, it is also possible and in many cases of advantage (for example, to produce various tints), to metallize a mixture of two different dyestuffs of the Formula 1 or a mixture of a dyestuff of that formula with another ortho:ortho'-dihydroxy-monoazo-dyestuff free from sulfonic acid and carboxylic acid groups.

The cobalt compounds so obtained contain one atom of cobalt in complex union with two monoazo-dyestuff molecules, and at least one of the monoazo-dyestuff molecules must correspond to the general Formula 1. Especially valuable are the cobalt compounds of this kind, which contain two molecules of the same monoazo-dyestuff of the Formula 1.

The new cobalt compounds are soluble in water and in weakly acid aqueous media, and are indeed more soluble than the starting materials used for making them. They are suitable for dyeing various substances such as plastic masses, resins, waxes, lacquers and the like, but more especially for dyeing and printing animal materials such as silk, leather and especially wool, and also for dyeing and printing synthetic materials composed of superpolyamides or superpolyurethanes. They are suitable above all for dyeing from a weakly alkaline, neutral or weakly acid, for example, acetic acid, bath. The dyeings so produced are distinguished by their good level character, good properties of wet fastness and very good fastness to light.

The following examples illustrate the invention, the parts and percentages being by weight unless otherwise stated, and the relationship of parts by weight to parts by volume being the same as that of the kilogram to the liter:

*Example 1*

34.3 parts of 2-amino-1-hydroxybenzene-4-sulfonic acid anilide-3'-sulfonic acid amide are dissolved in 200 parts of 1 N-hydrochloric acid at 40° C. The mixture is cooled to 0° C. by the addition of ice and diazotized at 0–10° C. with 25 parts of a 4 N-solution of sodium nitrite. The resulting yellow diazo-suspension is neutralized with sodium carbonate, and then coupled with a solution, cooled to about 5° C., of 14.8 parts of 2-hydroxynaphthalene in 100 parts of water, 4.2 parts of sodium hydroxide and 5 parts of sodium carbonate. When the coupling is finished the precipitated dyestuff is filtered off, washed with sodium chloride solution of 2 percent, strength and dried. The dyestuff dissolves in dilute sodium carbonate solution with a violet coloration and in concentrated sulfuric acid with a pure blue-red coloration.

4.98 parts of the dyestuff so obtained are suspended in 100 parts of water, then mixed with 8 parts by volume of a 2 N-solution of sodium hydroxide, heated to 80° C., and mixed with 11 parts of a cobalt sulfate solution having a cobalt content of 2.95 percent. After heating for a short time at 85–90° C. the formation of the complex is complete. The cobalt compound of the dyestuff is completely precipitated by neutralization with dilute acetic acid and the addition of sodium chloride. After being filtered off and dried, the dyestuff is a dark brown powder, which dissolves in hot water and dilute sodium carbonate solution with a bordeaux-red coloration and in concentrated sulfuric acid with a pure blue-red coloration, and dyes wool from a neutral or weakly acid bath bordeaux red tints of very good fastness to washing and light.

In the following table are given further complex cobalt compounds that can be made in an analogous manner. In column III is given the tint of the dyeing on wool or fibers of a superpolyamide produced with the cobalt complex of the dyestuff obtained from the components given in columns I and II.

| | I<br>Diazo-component | II<br>Coupling component | III<br>Cobalt complex |
|---|---|---|---|
| 1 | OH, $NH_2$, $SO_2NH$—⟨⟩—$SO_2NH_2$ (on benzene ring) | $CH_3$—CO—$CH_2$—C(=O)—HN—⟨⟩ | yellow. |

| | I<br>Diazo-component | II<br>Coupling component | III<br>Cobalt complex |
|---|---|---|---|
| 2 | 2-amino-1-hydroxy-4-(3'-sulfamyl-phenylsulfamyl)-benzene | CH₃—CO—CH₂—CO—NH—C₆H₄—Cl (o) | Do. |
| 3 | 2-amino-1-hydroxy-4-(3'-sulfamyl-phenylsulfamyl)-benzene | 1-phenyl-3-methyl-5-pyrazolone | yellow-brown. |
| 4 | 2-amino-1-hydroxy-4-(3'-sulfamyl-phenylsulfamyl)-benzene | 1-(4'-chlorophenyl)-3-methyl-5-pyrazolone | Do. |
| 5 | 2-amino-1-hydroxy-4-(3'-sulfamyl-phenylsulfamyl)-benzene | 1-n-butylcarbamyl-5-pyrazolone | brown-orange. |
| 6 | 2-amino-1-hydroxy-4-(3'-sulfamyl-phenylsulfamyl)-benzene | 6-bromo-2-hydroxynaphthalene | bluish-bordeaux. |
| 7 | 2-amino-1-hydroxy-4-(3'-sulfamyl-phenylsulfamyl)-benzene | 1-butyrylamino-7-hydroxynaphthalene | violet-grey. |
| 8 | 2-amino-1-hydroxy-4-(3'-sulfamyl-phenylsulfamyl)-benzene | 1-(4'-chlorophenylcarbamyl)-5-pyrazolone | brown-orange. |

| | I<br>Diazo-component | II<br>Coupling component | III<br>Cobalt complex |
|---|---|---|---|
| 9 | 2-amino-1-hydroxybenzene-4-sulfonic acid N-phenylamide-3'-sulfonic acid amide (OH, NH₂, SO₂NH-phenyl-SO₂NH₂) | (pyrazolone with phenyl: 1-phenyl-3-methyl-5-pyrazolone type) | brown-red. |
| 10 | OH, NH₂, SO₂NH-phenyl-SO₂NH₂ | barbituric acid | yellow-brown. |
| 11 | OH, NH₂, SO₂NH-phenyl-SO₂NH₂ | 2:4-dihydroxyquinoline | orange-brown. |
| 12 | OH, NH₂, SO₂NH-phenyl-SO₂NH₂ | β-naphthylamine | grey. |
| 13 | OH, NH₂, SO₂-NH-phenyl-SO₂NH₂ | 1-acetylamino-7-hydroxynaphthalene | violet-grey. |
| 14 | OH, NH₂, SO₂NH-phenyl(SO₂NH₂) arrangement | do | Do. |
| 15 | OH, NH₂, SO₂NH₂, SO₂-NH-phenyl | 1-NH-CO-OCH₃, HO- naphthalene | Do. |

The 2-amino-1-hydroxybenzene-4-sulfonic acid N-phenylamide-3'-sulfonic acid amide used as diazo component in this example can be made by reacting 1-chloro-2-nitrobenzene-4-sulfonic acid chloride with 1-aminobenzene-3-sulfonic acid amide, replacing the chlorine atom in the resulting 1-chloro-2-nitrobenzene-4-sulfonic acid N-phenylamide-3'-sulfonic acid amide by a hydroxyl group by means of an alkali or alkaline earth metal hydroxide, and finally reducing the nitro group to an amino group in known manner.

The 2-amino-1-hydroxybenzene-5-sulfonic acid N-phenylamide-3'-sulfonic acid amide can be made by reacting 1:2-benzoxazolone-5-sulfonic acid chloride with 1-aminobenzene-3-sulfonic acid amide, and splitting up the oxazolone ring in the resulting 1:2-benzoxazolone-5-sulfonic acid N-phenylamide-3'-sulfonic acid amide, for example, by means of an alkali hydroxide.

Example 2

4.98 parts of the dyestuff obtained as described in the first paragraph of Example 1 and 5.76 parts of the dyestuff from diazotized 2-amino-1-hydroxybenzene-4-sulfonic acid-2'-chloranilide-5'-sulfonic acid methylamide and 1-phenyl-3-methyl-5-pyrazolone are suspended in 200 parts of water, then mixed with 16 parts by volume of a 2 N-solution of sodium hydroxide, and the whole is heated to 80° C. and mixed with 22 parts of a cobalt sulfate solution having a cobalt content of 2.95 percent. After heating the mixture for a short time at 78–82° C. the formation of the complex is complete. The cobalt compound is completely precipitated by the addition of sodium chloride and by neutralization with dilute acetic acid. The filtered off and dried dyestuff is a red-brown powder which dissolves in water with a yellow-red coloration and in concentrated sulfuric acid with a red coloration, and dyes wool from a weakly alkaline, neutral or weakly acid bath red-brown tints.

In the following table are given further cobalt mixed complexes, which are obtained from the monoazo-dyestuffs given in columns I and II. The tints of the dyeings on wool are given in column III.

the boil in the course of ½ hour, and dyeing is continued for ¾ hour at the boil. Finally the wool is rinsed with cold water and dried. The wool is dyed a red-brown tint which is fast to washing and has a good fastness to light.

The same dyeing can be produced by dyeing from a neutral bath, that is to say, without the addition of acetic acid to the dyebath.

A red-brown dyeing is also produced, by using instead of wool the fibers of a superpolyamide and otherwise proceeding in the same manner.

What is claimed is:

1. A complex cobalt compound of monoazo-dyestuffs free from sulfonic acid and carboxylic acid groups, which contains substantially one atomic proportion of cobalt in complex union for two molecular proportions of monoazo-dyestuff and in which at least one monoazo-dyestuff present corresponds to the formula $$\begin{array}{cc} OH & Y \\ | & | \\ R_1-N=N-R_2 \\ | \\ SO_2-NH-X \end{array}$$

wherein Y represents a member selected from the group consisting of a hydroxyl and an amino group, $R_1$ represents a benzene radical bound to the azo linkage in ortho-position relatively to the hydroxyl group, $R_2$—Y represents the radical of a coupling component bound to the azo linkage in a position vicinal to the substituent Y, and X represents a benzene radical containing a sulfonic acid amide group.

2. A complex cobalt compound of monoazo-dyestuffs free from sulfonic acid and carboxylic acid groups, which contains one atom of cobalt bound in complex union to

| | I | II | III |
|---|---|---|---|
| 1 | 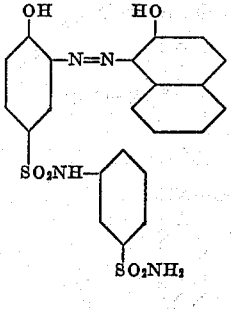 4.98 parts | 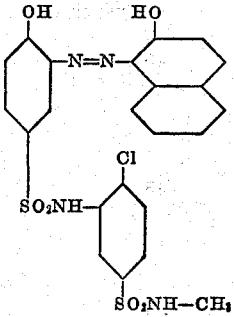 5.56 parts | reddish-bordeaux. |
| 2 | 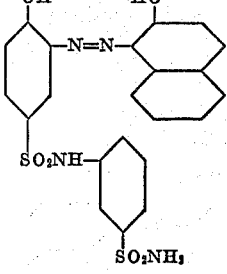 4.98 parts | 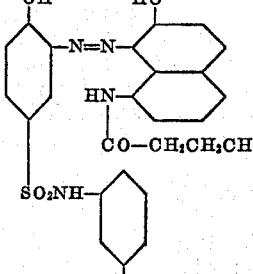 5.83 parts | bluish bordeaux. |

Example 3

2 parts of the cobaltiferous dyestuffs obtained as described in Example 2 are dissolved in 4000 parts of water, 10 parts of crystalline sodium sulfate are added, and 100 parts of well wetted wool are entered at 40–50° C. into the dyebath so prepared. There are then added 2 parts of acetic acid of 40 percent strength, the bath is raised to substantially two monoazo-dyestuff molecules both of which correspond to the formula

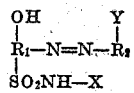

wherein Y represents a member selected from the group consisting of an HO- and an H₂N-group, R₁ represents a benzene radical bound to the azo linkage in ortho-position relatively to the hydroxyl group, R₂—Y represents the radical of a coupling component bound to the azo linkage in a position vicinal to the substituent Y and X represents a benzene radical containing a sulfonic acid amide group.

3. A complex cobalt compound of monoazo-dyestuffs free from sulfonic acid and carboxylic acid groups, which contains one atom of cobalt bound in complex union to substantially two monoazo-dyestuff molecules both of which correspond to the formula

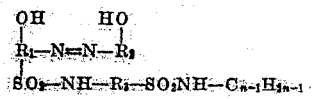

wherein R₃ represents a benzene radical, n represents a whole number up to two, R₁ represents a benzene radical bound to the azo linkage in ortho-position relatively to the hydroxyl group and R₂—OH represents the radical of a coupling component bound to the azo linkage in a position vicinal to the HO-group.

4. A complex cobalt compound of monoazo-dyestuffs free from sulfonic acid and carboxylic acid groups, which contains one atom of cobalt bound in complex union with substantially two monoazo-dyestuff molecules one of which corresponds to the formula

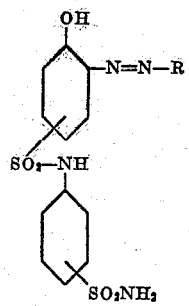

and the other to the formula

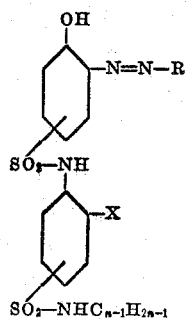

wherein R represents a member selected from the group consisting of a 2-hydroxynaphthalene radical bound to the azo group in 1-position and a 5-pyrazolone radical bound to the azo linkage in 4-position, X represents a member of the group consisting of a chlorine and a hydrogen atom and n is a whole number up to 2.

5. A complex cobalt compound of monoazo-dyestuffs free from sulfonic acid and carboxylic acid groups, which contains one atom of cobalt bound in complex union to substantially two monoazo-dyestuff molecules both of which correspond to the formula

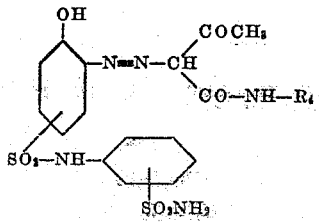

wherein R₄ represents a benzene radical.

6. A complex cobalt compound of monoazo-dyestuffs free from sulfonic acid and carboxylic acid groups, which contains one atom of cobalt bound in complex union to substantially two monoazo-dyestuff molecules both of which correspond to the formula

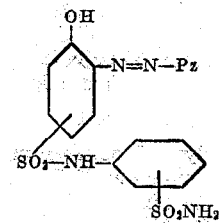

wherein Pz represents a 5-pyrazolone radical bound to the azo linkage in 4-position.

7. A complex cobalt compound of monoazo-dyestuffs free from sulfonic acid and carboxylic acid groups, which contains one atom of cobalt bound in complex union to substantially two monoazo-dyestuff molecules both of which correspond to the formula

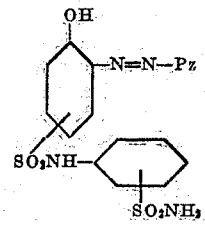

wherein Pz represents a 1-aryl-3-methyl-5-pyrazolone radical bound to the azo linkage in 4-position.

8. A complex cobalt compound of monoazo-dyestuffs free from sulfonic acid and carboxylic acid groups, which contains one atom of cobalt bound in complex union to substantially two monoazo-dyestuff molecules both of which correspond to the formula

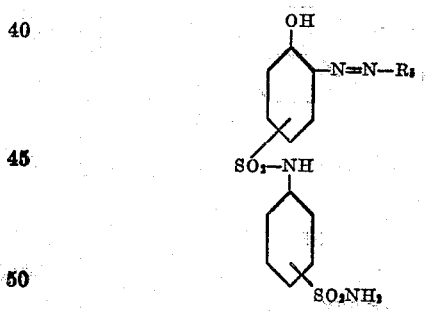

wherein R₅ represents a 2-hydroxynaphthalene radical bound to the azo linkage in 1-position.

9. A complex cobalt compound of monoazo-dyestuffs free from sulfonic acid and carboxylic acid groups, which contains one atom of cobalt bound in complex union to substantially two monoazo-dyestuff molecules both of which correspond to the formula

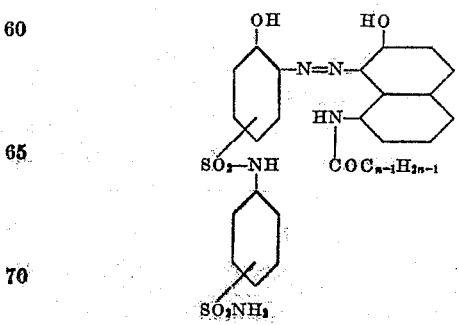

wherein n is a whole number up to 5.

10. The complex cobalt compound which contains one atom of cobalt bound in complex union to substantially two monoazo-dyestuff molecules both of which correspond to the formula

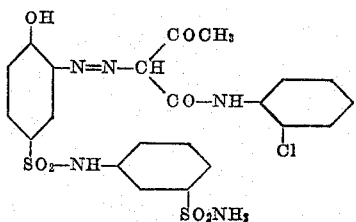

11. The complex cobalt compound which contains one atom of cobalt bound in complex union to substantially two monoazo-dyestuff molecules both of which correspond to the formula

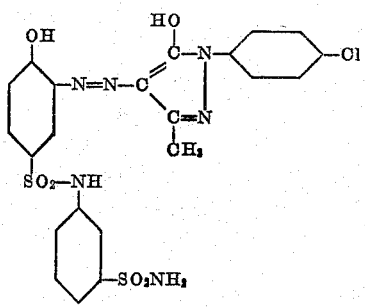

12. The complex cobalt compound which contains one atom of cobalt bound in complex union to substantially two monoazo-dyestuff molecules both of which correspond to the formula

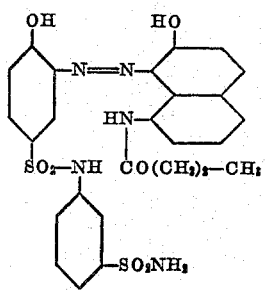

13. The complex cobalt compound which contains one atom of cobalt bound in complex union to substantially two monoazo-dyestuff molecules both of which correspond to the formula

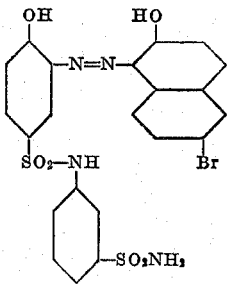

14. The complex cobalt compound which contains one atom of cobalt bound in complex union with substantially two monoazo-dyestuff molecules one of which corresponds to the formula

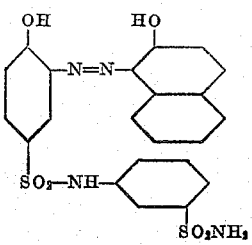

and the other to the formula

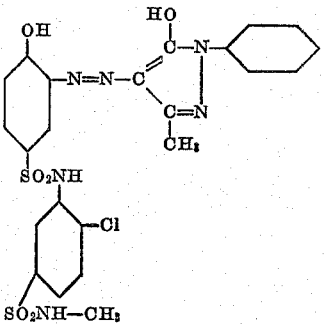

References Cited in the file of this patent
UNITED STATES PATENTS

| | | |
|---|---|---|
| 2,443,226 | Carson | June 15, 1948 |
| 2,495,244 | Felix et al. | Jan. 24, 1950 |
| 2,565,898 | Widmer | Aug. 28, 1951 |
| 2,572,394 | Ruckstuhl et al. | Oct. 23, 1951 |
| 2,597,676 | Schetty | May 20, 1952 |
| 2,606,185 | Widmer | Aug. 5, 1952 |
| 2,634,263 | Steinemann | Apr. 7, 1953 |

OTHER REFERENCES

Crossley Metallized Azo Dyes, American Dyestuff Rep., Mar. 7, 1938, pgs. 124–5.